United States Patent
Cai et al.

(10) Patent No.: US 11,765,692 B2
(45) Date of Patent: *Sep. 19, 2023

(54) SYSTEM AND METHOD FOR UPLINK RESOURCE REUSE

(71) Applicant: Honor Device Co., Ltd., Guangdong (CN)

(72) Inventors: Zhijun Cai, Euless, TX (US); Sean Bartholomew Simmons, Waterloo (CA); James Earl Womack, Bedford, TX (US); Takashi Suzuki, Ichikawa (JP); Yi Yu, Irving, TX (US)

(73) Assignee: HONOR DEVICE CO., LTD., Shenzhen (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/465,532

(22) Filed: Sep. 2, 2021

(65) Prior Publication Data

US 2022/0061028 A1    Feb. 24, 2022

Related U.S. Application Data

(63) Continuation of application No. 12/341,948, filed on Dec. 22, 2008, now Pat. No. 11,115,957.

(60) Provisional application No. 61/016,920, filed on Dec. 27, 2007.

(51) Int. Cl.
*H04W 72/00* (2023.01)
*H04W 72/02* (2009.01)

(52) U.S. Cl.
CPC .................. *H04W 72/02* (2013.01)

(58) Field of Classification Search
CPC ..................................................... H04W 72/00
See application file for complete search history.

(56) References Cited

U.S. PATENT DOCUMENTS

| | | | |
|---|---|---|---|
| 8,073,436 B2 | 12/2011 | Yaqub et al. | |
| 2004/0027994 A1 | 2/2004 | Baines | |
| 2004/0109435 A1* | 6/2004 | Alasti | H04L 1/0006 370/350 |
| 2004/0240401 A1* | 12/2004 | Willenegger | H04B 7/264 370/542 |
| 2005/0243744 A1* | 11/2005 | Tan | H04W 72/10 370/278 |
| 2006/0023666 A1* | 2/2006 | Jalali | H04L 5/023 370/334 |
| 2006/0039319 A1* | 2/2006 | Lee | H04W 72/1284 370/328 |

(Continued)

FOREIGN PATENT DOCUMENTS

EP   1045559 A1   10/2000

OTHER PUBLICATIONS

Jiang, D., et al., "Principle and Performance of Semi-Persistent Scheduling for VoIP in LTE System," IEEE< 2007, pp. 2861-2864.

(Continued)

*Primary Examiner* — Luat Phung
(74) *Attorney, Agent, or Firm* — Conley Rose, P.C.

(57) ABSTRACT

A system and method are disclosed that allows for uplink resource reuse. A user device is provided an uplink resource for a first data type. If the user device does not have enough data of the first data type to fill the granted uplink resource, the user device fills the granted uplink resource with a second data type.

20 Claims, 5 Drawing Sheets

(56) References Cited

U.S. PATENT DOCUMENTS

| | | | |
|---|---|---|---|
| 2006/0098643 A1* | 5/2006 | Pfeffer | H04L 47/2458 370/392 |
| 2006/0153176 A1* | 7/2006 | Caswell | H04M 11/06 370/356 |
| 2007/0097936 A1* | 5/2007 | Lee | H04W 74/02 370/338 |
| 2010/0238875 A1* | 9/2010 | Sung | H04W 72/1289 370/329 |
| 2011/0194502 A1 | 8/2011 | Sung et al. | |

OTHER PUBLICATIONS

3GPP TSG-RAN WG2 Meeting #46, "Non-Scheduled Tansmission for HSUPA," Nokie, R2-050332, Scottsdale, AZ, Feb. 14-18, 4 pages.

* cited by examiner

SYSTEM AND METHOD FOR UPLINK RESOURCE REUSE

CROSS-REFERENCE TO RELATED APPLICATIONS

This application claims priority to U.S. application Ser. No. 12/341,948 filed Dec. 22, 2008 by Zhijun Cai, et al. entitled, "System and Method for Uplink Resource Reuse", which claims priority to U.S. Provisional Patent Application No. 61/016,920 filed Dec. 27, 2007 by Zhijun Cai, et al. entitled, "System and Method for Uplink Resource Reuse", which are incorporated by reference herein as if reproduced in their entireties.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node-B (eNB) rather than a base station or other systems and devices that are more highly evolved than the equivalent equipment in a traditional wireless telecommunications system. Such advanced or next generation equipment is typically referred to as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. The MBMS may be communicated from an eNB to a UE using point-to-point (PTP) communication or point-to-multipoint (PTM) communication.

In wireless communication systems, transmission from the network access equipment (e.g., eNB) to the UE is referred to as a downlink transmission. Communication from the UE to the network access equipment is referred to as an uplink transmission.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched based telephone communication over the Internet. The term "VoIP" will refer herein to any packet switched call connected via the Internet, regardless of the specific technology that might be used to make the call.

For a wireless VoIP call, the signal that carries data between a UE and an eNB can have a specific set of frequency and time parameters and other characteristics that might be specified by the eNB. A connection between a UE and an eNB that has a specific set of such characteristics can be referred to as a resource. An eNB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
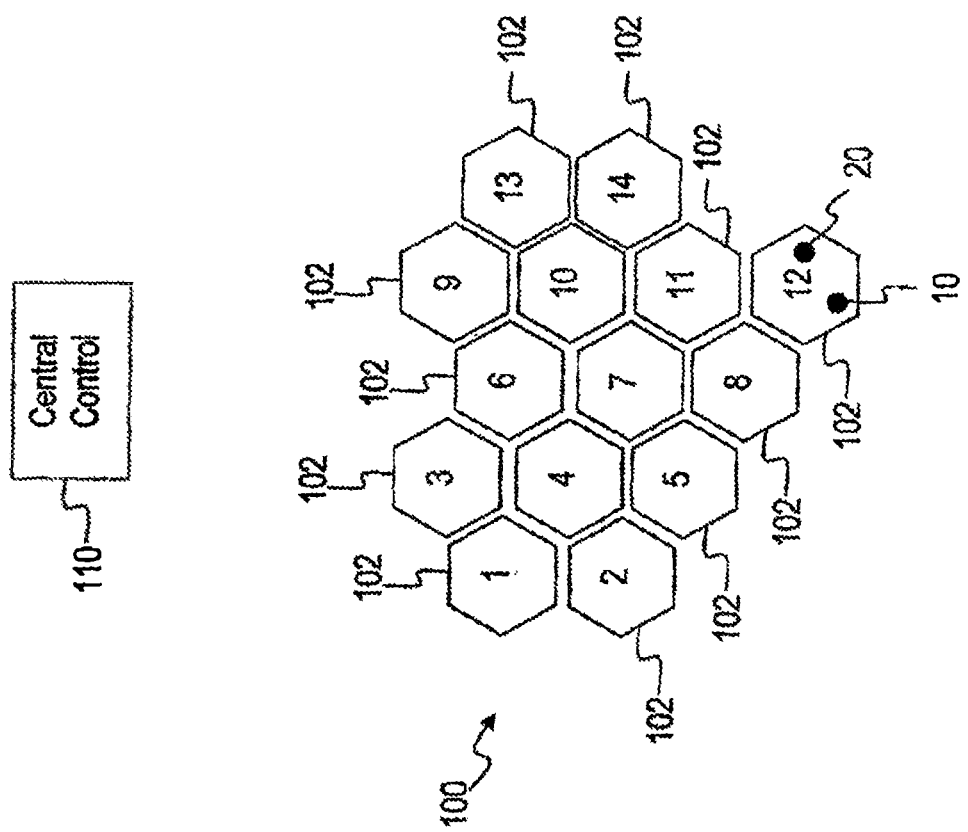
FIG. 1 is an illustration of a cellular network according to an embodiment of the disclosure.

FIG. 1 illustrates an exemplary cellular network 100 according to an embodiment of the disclosure. The cellular network 100 may include a plurality of cells 1021, 1022, 1023, 1024, 1025, 1026, 1027, 1028, 1029, 10219, 10211, 10212, 10213, and 10214 (collectively referred to as cells 102). As is apparent to persons of ordinary skill in the art, each of the cells 102 represents a coverage area for providing cellular services of the cellular network 100 through communication from a network access equipment (e.g., eNB). While the cells 102 are depicted as having non-overlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell 10212, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell 10212, it should be understood that network access equipment would be present in each of the cells 102. A central control 110 may also be present in the cellular network 100 to oversee some of the wireless data transmissions within the cells 102.

Figure 2:
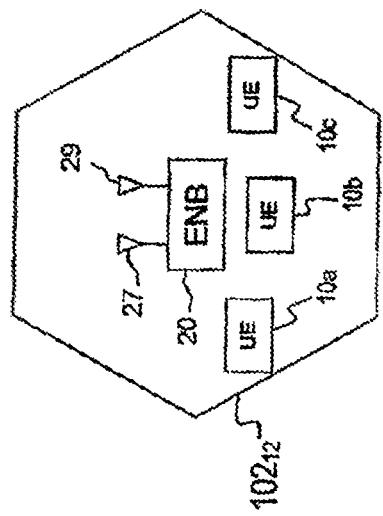
FIG. 2 is an illustration of a cell in a cellular network according to an embodiment of the disclosure.

FIG. 2 depicts a more detailed view of the cell 10212. The network access equipment 20 in cell 10212 may promote communication via a transmitter 27, a receiver 29, and/or other well known equipment. Similar equipment might be present in the other cells 102. A plurality of UEs 10 are present in the cell 10212, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

As referenced above, VoIP systems are packet based systems. There can be periods of silence in a VoIP call during which no voice-based data packets are transmitted between a UE and an eNB. For example, if a first party in a call pauses in the course of a conversation, a silent period might occur in the uplink from that party's UE to the eNB until that party resumes talking. Similarly, a silent period might occur in the downlink from the eNB to the UE of the second party in the conversation until the first party resumes talking. However, in some embodiments, there is a transient period between the talking period and the periods of silence.

Figure 3:
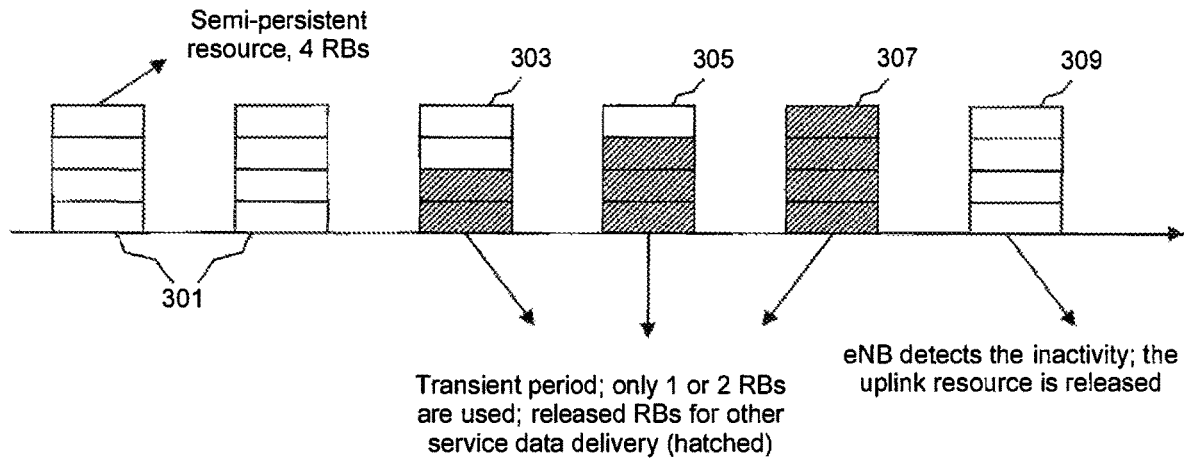
FIG. 3 is an illustration of an uplink resource allocation.

As shown in FIG. 3, during a transient period, for example, from talk-spurt to silence, the payload size may be suddenly changed. As shown by reference numeral 301, the payload size starts out at full-rate. Then the payload size may decrease to half-rate, as shown in 303, to 1/8 rate as shown in 305 to zero as shown in 307. In this case, the modulation coding scheme (MCS) may not be changed but the needed resource may be reduced. The resource may be wasted in this case especially in the uplink during this short transient period.

In one embodiment, on the uplink, the resource assigned to the UE may not be released immediately, because the UE is still using a part of the resource. Since the resource is not released, another user cannot use that resource during the transition period. However, since the UE knows that it does not have enough VoIP data to transmit in its scheduled resource, the UE can use the un-used, but allocated resources, to deliver other application data, e.g., email, HTTP request, etc.

In one embodiment, the other application data will be multiplexed with the VoIP data in the MAC layer in the UE, and then mapped onto the uplink semi-persistent resource for transmission. In semi-persistent scheduled services, e.g., voice over internet protocol (VoIP), some resources are allocated semi-persistently, so that the UE does not incur additional signaling such as scheduling grants, modulation and coding information, etc. Each multiplexed data packet will have its own header information so the network access equipment can easily de-multiplex the data in the MAC layer after layer 1 reception and deliver the corresponding data to the higher layer channels.

Figure 4:
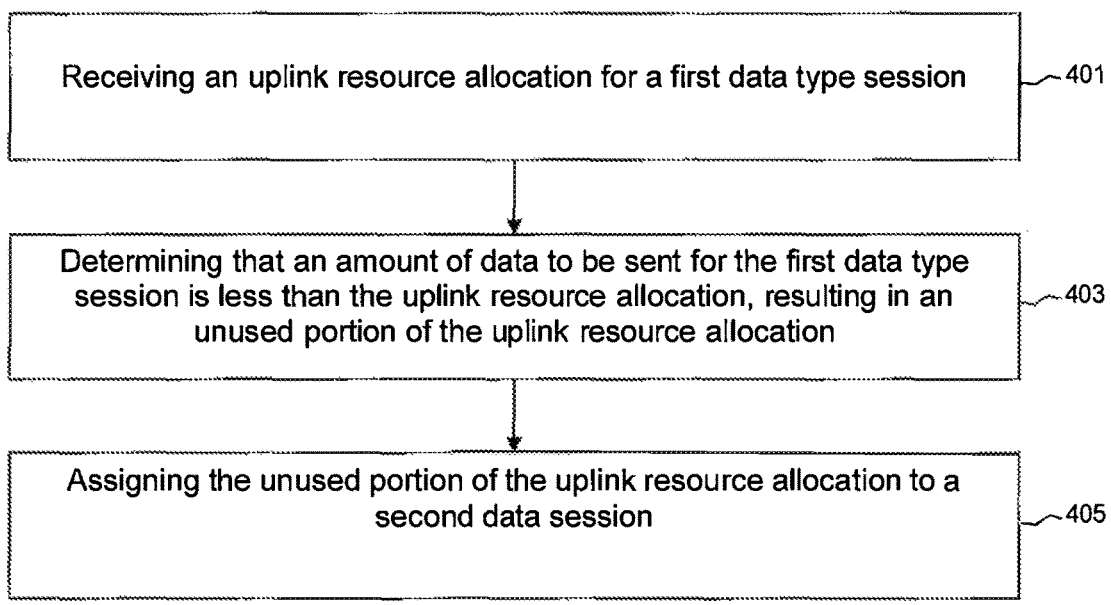
FIG. 4 is a flow chart corresponding to a user equipment embodiment.

FIG. 4 illustrates a method in accordance with one embodiment of the UE. In block 401, a receive module 508 (shown in FIG. 6), receives an uplink resource allocation for a first data type session, e.g., a VoIP session. In block 403, the DSP 502 (shown in FIG. 6) determines that an amount of data to be sent for the first data type session is less than the uplink resource allocation resulting in an unused portion of the uplink resource allocation. In block 405, the DSP 403 assigns the unused portion of the uplink resource to a second data type session, e.g., email or HTTP. In some embodiments, the uplink resource allocation is a semi-persistent resource allocation.

Figure 5:
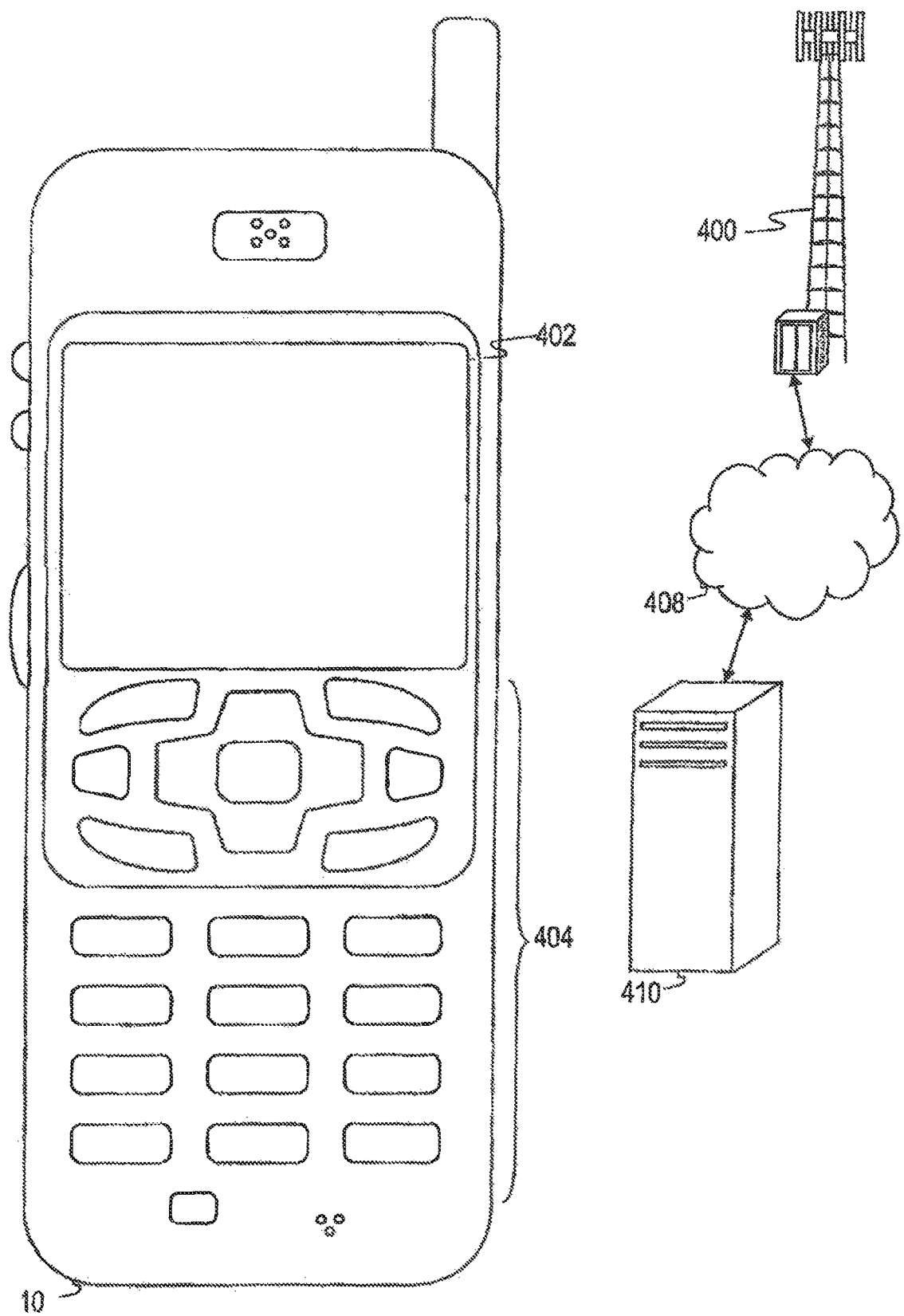
FIG. 5 is a diagram of a wireless communications system including a mobile device operable for some of the various embodiments of the disclosure.

FIG. 5 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 6:
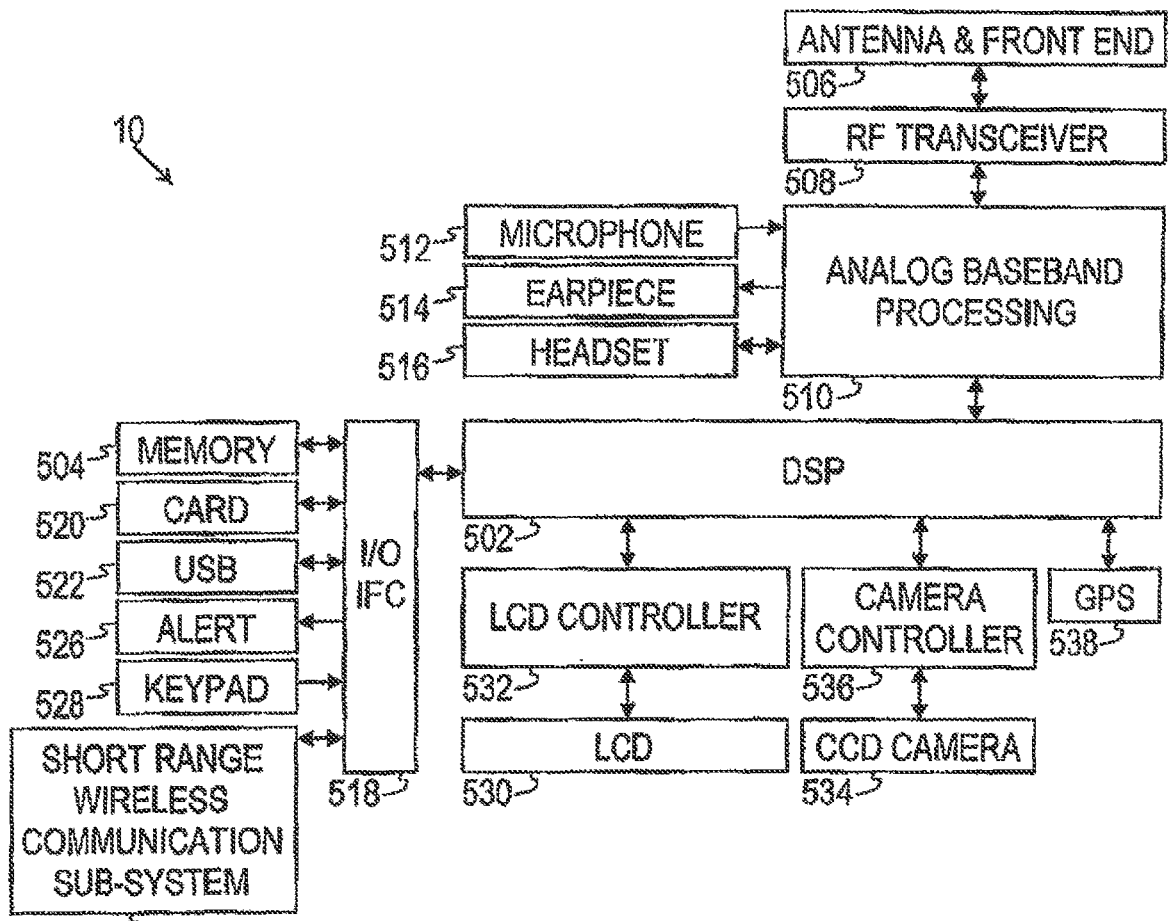
FIG. 6 is a block diagram of a mobile device operable for some of the various embodiments of the disclosure.

FIG. 6 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 7:
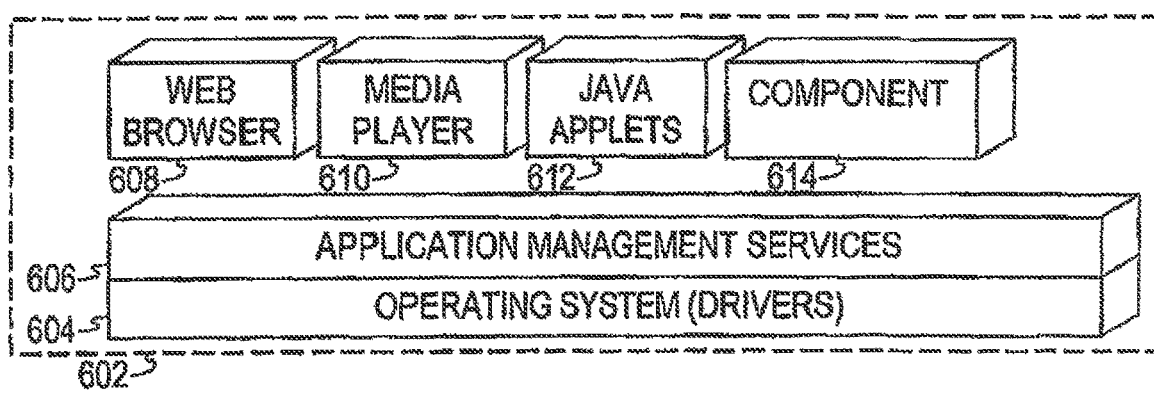
FIG. 7 is a diagram of a software environment that may be implemented on a mobile device operable for some of the various embodiments of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 7 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 8:
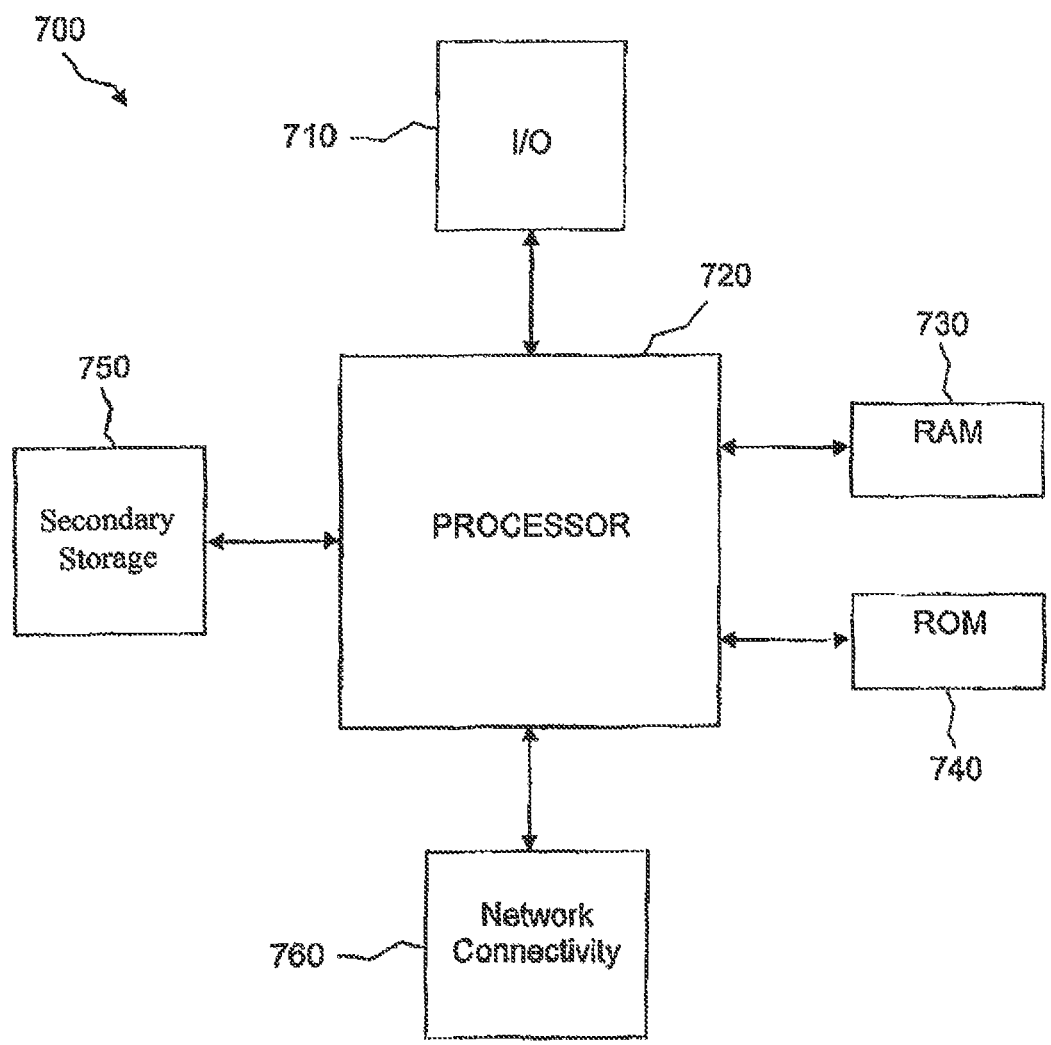
FIG. 8 is an exemplary general purpose computer according to one embodiment of the present disclosure.

The UEs 10, eNBs 20, and central control 110 of FIG. 1 and other components that might be associated with the cells 102 may include any general-purpose computer with sufficient processing power, memory resources, and network throughput capability to handle the necessary workload placed upon it. FIG. 8 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 700, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 700 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for uplink resource reuse by a user equipment (UE), the method comprising:
receiving a semi-persistent uplink resource allocation for a first data type session, wherein the semi-persistent uplink resource allocation comprises a plurality of individual uplink resource allocations spaced in time, and wherein the first data type session is a Voice over Internet Protocol (VOIP) session;
determining that an amount of data to be sent for the VOIP session is less than a first individual uplink resource allocation of the plurality of individual uplink resource allocations;
assigning, after determining, an unused portion of the first individual uplink resource allocation for the VOIP session to send data for a second data type session of the UE during a transient period; and
using a portion of the first individual uplink resource allocation to send the amount of data for the VOIP session, and using the unused portion of the first individual uplink resource allocation to send data for the second data type session.

2. The method of claim 1, wherein the second data type session comprises a non-VOIP session.

3. The method of claim 1, wherein the second data type session comprises an email session or an HTTP session.

4. The method of claim 1, wherein the transient period occurs between a talking period and a silence period.

5. The method of claim 1, further comprising not releasing, by the UE during the transient period, the semi-persistent uplink resource allocation.

6. The method of claim 1, further comprising using, by the UE, a modulation and coding scheme for the VOIP session and the second data type session, wherein the modulation and coding scheme is the same for the VOIP session and the second data type session.

7. A user equipment (UE), comprising:
a processor; and
a memory coupled to the processor and containing instructions that, when executed by the processor, cause the UE to be configured to:
receive a semi-persistent uplink resource allocation for a first data type session, wherein the semi-persistent uplink resource allocation comprises a plurality of individual uplink resource allocations spaced in time, and wherein the first data type session is a Voice over Internet Protocol (VOIP) session;
determine an amount of data to be sent for the VOIP session is less than a first individual uplink resource allocation of the plurality of individual uplink resource allocations;
assign, after the determination, an unused portion of the first individual uplink resource allocation for the VOIP session to send data for a second data type session of the UE during a transient period; and
use a portion of the first individual uplink resource allocation to send the amount of data for the VOIP session, and use the unused portion of the first individual uplink resource allocation to send data for the second data type session.

8. The UE of claim 7, wherein the second data type session comprises a non-VOIP session.

9. The UE of claim 7, wherein the second data type session comprises an email session or an HTTP session.

10. The UE of claim 7, wherein the transient period occurs between a talking period and a silence period.

11. The UE of claim 7, wherein the semi-persistent uplink resource allocation is not released during the transient period.

12. The UE of claim 7, wherein a modulation and coding scheme is used for the VOIP session and the second data type session, and wherein the modulation and coding scheme is the same for the VOIP session and the second data type session.

13. A method for uplink resource reuse by a user equipment (UE), the method comprising:
receiving an uplink resource allocation for the UE from a base station, wherein the uplink resource allocation comprises a first individual uplink resource allocation;
assigning a portion of the first individual uplink resource allocation to a first type of data, wherein an amount of the first type of data to be sent is less than the first individual uplink resource allocation;
assigning an unassigned portion of the first individual uplink resource allocation to a second type of data; and
sending the first type of data and the second type of data to the base station using a same modulation and coding scheme for the first type of data and the second type of data.

14. The method of claim 13, wherein the first type of data is Voice over Internet Protocol (VOIP) data.

15. The method of claim 14, wherein the first type of data and the second type of data are sent during a transient period.

16. The method of claim 15, wherein the transient period occurs between a talking period and a silence period.

17. The method of claim 15, further comprising not releasing, during the transient period, the uplink resource allocation.

18. The method of claim 14, wherein the second type of data is not VOIP data.

19. The method of claim 13, wherein the second type of data is email data or HTTP data.

20. The method of claim 13, further comprising:
multiplexing the first type of data and the second type of data to create multiplexed data, and
mapping the multiplexed data to the first individual uplink resource allocation.

\* \* \* \* \*

UNITED STATES PATENT AND TRADEMARK OFFICE
CERTIFICATE OF CORRECTION

PATENT NO. : 11,765,692 B2
APPLICATION NO. : 17/465532
DATED : September 19, 2023
INVENTOR(S) : Zhijun Cai et al.

Page 1 of 1

It is certified that error appears in the above-identified patent and that said Letters Patent is hereby corrected as shown below:

In the Claims

Claim 5, Column 9, Line 61: "by the UE during" should read "during"

Claim 6, Column 9, Lines 63 and 64: "using, by the UE, a modulation" should read "using a modulation"

Signed and Sealed this
Twenty-first Day of November, 2023

Katherine Kelly Vidal
*Director of the United States Patent and Trademark Office*